United States Patent [19]

Zaweski et al.

[11] Patent Number: 4,954,274

[45] Date of Patent: Sep. 4, 1990

[54] SULFURIZED OLEFIN EXTREME PRESSURE ADDITIVES

[76] Inventors: Edward F. Zaweski, 12260 Brookshire Ave., Baton Rouge, La. 70815; James G. Jolly, 5233 Halls Ferry Dr., Baton Rouge, La. 70817

[21] Appl. No.: 363,443

[22] Filed: Jun. 6, 1989

Related U.S. Application Data

[63] Continuation of Ser. No. 138,937, Dec. 29, 1987, abandoned.

[51] Int. Cl.$^5$ ............................................ C10M 135/02
[52] U.S. Cl. ..................................... 252/45; 252/48.8; 568/18
[58] Field of Search ................... 252/45, 48.8; 568/18

[56] References Cited

U.S. PATENT DOCUMENTS

| | | | |
|---|---|---|---|
| 2,565,493 | 8/1951 | Gardner | 252/45 |
| 3,410,800 | 11/1968 | Ford et al. | 252/48.8 |
| 3,697,499 | 10/1972 | Myers | 252/48.8 |
| 4,204,969 | 5/1980 | Papay et al. | 252/45 |
| 4,225,488 | 9/1980 | Horodysky et al. | 252/45 |
| 4,240,958 | 12/1980 | Braid | 252/45 |
| 4,563,302 | 1/1986 | Griffin et al. | 252/45 |
| 4,645,610 | 2/1987 | Born et al. | 252/45 |
| 4,710,273 | 12/1987 | Okamoto | 568/18 |

*Primary Examiner*—William R. Dixon, Jr.
*Assistant Examiner*—Jerry D. Johnson

[57] ABSTRACT

Sulfurized olefins are produced by reacting sulfur monochloride with a monoolefin (e.g. isobutene) in the presence of minor amounts of an active Lewis acid (e.g. ferric chloride) to form an adduct, reacting the adduct with sulfur and sodium sulfide in an aqueous alkanol made at a ratio of 0.02–0.4 gram atom of sulfur per gram mole of sodium sulfide and then recovering the reaction product. Olefin polysulfides obtained by this method are soluble in both mineral and synthetic lubricating oils (including those of the polyalphaolefin type) and are usable as extreme pressure additives when incorporated into such lubricating oils.

16 Claims, No Drawings

SULFURIZED OLEFIN EXTREME PRESSURE ADDITIVES

This application is a continuation of application Ser. No. 138,937, filed Dec. 29, 1987 now abandoned.

BACKGROUND OF THE INVENTION

This invention relates to sulfurized olefins and, in particular, to polysulfurized olefins used in lubricating oil compositions and to a method for preparing same.

Sulfurized olefins are used in lubricants such as crankcase oil and gear lubricants to provide extreme pressure properties.

Papay et al, U.S. Pat. No. 4,204,969 describes such a product in which sulfur monochloride is reacted with an aliphatic monoolefin to obtain an intermediate which is reacted with sulfur and sodium sulfide.

One problem in the field of sulfurized olefin additives used for improving the extreme pressure properties of lubricants continues to be the development of a sulfurized polyolefin additive which is sufficiently soluble in both mineral oils and synthetic oils (particularly those of the polyalphaolefin type) to be usable as extreme pressure additives.

This problem is addressed in Born et al, U.S. Pat. No. 4,645,610 which teaches that the solubility of such olefin polysulfide additives in both mineral and synthetic oils is inversely proportional to the sulfur content of the additive. That is, as the sulfur content of the additive increases the solubility of the additive in both mineral and synthetic oils (particularly those of the polyalphaolefin type) decreases. Reportedly, olefin polysulfide additives of high sulfur content having enhanced solubility in both mineral and synthetic oils can be obtained according to Born et al by contacting an addition product produced by the reaction of at least one aliphatic monoolefin containing 2 to 5 carbon atoms and sulfur monochloride or dichloride with a hydrocarbyl halide and at least one sulfur compound selected from sulfides, hydrosulfides and polysulfides of alkali metals, ammonium or alkaline-earth metals and usually elemental sulfur in an aqueous or aqueous alcoholic medium at certain reaction conditions.

Griffin et al, U.S. Pat. No. 4,563,302 also reports that sulfurized olefins having improved solubility in lubricating oils (especially in alpha-olefin oligomer synthetic oils) can be obtained by reacting an alkyl mercaptan, sulfur, sodium sulfide and, optionally, sodium hydrosulfide in an aqueous alcohol medium with an adduct prepared by reacting a monoolefin with sulfur monochloride or sulfur dichloride.

SUMMARY OF THE INVENTION

Unexpectedly, it has now been discovered that sulfurized olefinic compounds which are soluble in both mineral and synthetic oils of lubricating viscosity at concentrations sufficient to improve the extreme pressure properties of such oils (including those of the polyalphaolefin type) can be obtained by reacting sulfur monochloride with aliphatic monoolefin in the presence of minor amounts of an active Lewis acid and thereafter reacting the adduct so produced with sulfur and sodium sulfide in aqueous alkanol. The adduct, produced in this fashion, after sulfurization affords a lubricant additive sufficiently soluble in both mineral and synthetic oils to be usable as an extreme pressure additive in either type of lubricant.

In accordance with the invention, the starting olefins are the monoethylenically unsaturated aliphatic hydrocarbons referred to as aliphatic monoolefins containing 3 to about 6 carbon atoms. These include 1-butene, 2-butene, isobutene, 1-pentene, 2-pentene, 2-methyl-1-butene, 3-methyl-1-butene, 2-methyl-2-butene, 1-hexene, 2-hexene, 3-hexene, 2-methyl-1pentene, 2-methyl-2-pentene, 2-ethyl-2-butene and the like including mixtures thereof.

Preferably, the olefins are branched-chain olefins such as isobutene, 2-methyl-1-butene, 2-methyl-2-butene, 2-methyl-2pentene, and the like. More preferably, the ethylenic double bond adjoins a tertiary carbon atom such as isobutylene, the most preferred olefin.

The first stage reaction is preferably conducted by adding the olefin to the sulfur monochloride. The olefin can be added as a gas or liquid. Preferably, it is added beneath the surface of the sulfur monochloride as a liquid.

In practice, the olefin is added until the reaction with the sulfur monochloride stops as indicated by loss of exotherm. An amount of about 0.45–1.5 gram moles of olefin for each 0.3–0.75 gram mole of sulfur monochloride usually suffices. A preferred amount is about 1.7–2.0 gram moles of olefin per gram mole of sulfur monochloride.

As stated hereinabove, the reaction of the olefin and the sulfur monochloride is carried out in the presence of minor amounts of an active Lewis acid. The Lewis acid can be added to the sulfur monochloride initially, added to the reaction mixture continuously or periodically during the course of the olefin addition, or it can be mixed with the olefin and added together with the olefin. The preferred mode of addition is to add the entire amount initially to the sulfur monochloride and then add the olefin.

The term active Lewis acid refers to any Lewis acid or electron acceptor which when utilized in accordance with the teachings set forth herein produces an adduct which, after sulfurization, affords a lubricant additive possessing sufficient solubility in either mineral or synthetic oils (especially those of the polyalphaolefin type) to function as an extreme pressure additive in such oils. Examples of Lewis acids which can be used in the practice of the invention include aluminum bromide, aluminum fluoride, boron trifluoride, boron trichloride, stannic chloride, titanium tetrachloride, ferric chloride, ferric bromide, aluminum chloride, and the like. Ferric chloride is the preferred Lewis acid for use in the practice of the present invention and is readily available commercially.

The amount of Lewis acid used in the practice of the invention is an amount which will produce olefin polysulfides of sufficient solubility in mineral and synthetic oils that they can be used in such oils as effective extreme pressure additives. The amount may vary with the specific Lewis acid used. The amount required is readily determined experimentally by adding the particular Lewis acid selected for use in the preparation of the adduct to the reaction mixture of sulfur monochloride and monoolefin until an adduct is produced, which, as indicated previously, after sulfurization affords an additive possessing the desired solubility and extreme pressure properties both in mineral and synthetic oils.

In general, minor amounts which can vary from about 0.025 percent to about 5.0 percent by weight of Lewis acid based on the weight of sulfur monochloride are used in the invention. A preferred amount is from about 0.05 percent to about 3.0 percent by weight. The most preferred is about 0.1 percent by weight.

The first stage reaction can be conducted at any temperature high enough to cause the reaction to proceed, but not so high as to cause decomposition of the reactants or products. A useful range is about 30°–100° C. A more preferred range is about 40°–75° C. and a most preferred range is about 50°–60° C.

The first stage reaction should be conducted for a time sufficient to complete the reaction between the sulfur monochloride and olefin. This is usually limited by heat removal. Olefin feed rate is preferably controlled to hold the temperature within the desired range. When the sulfur monochloride has been consumed, the temperature will drop. External heat may be added to continue the reaction for a further time, but this does not appear to be necessary. The overall time required to complete the reaction depends upon the scale of the processing and can vary from a few minutes up to 12 or more hours. The time is not critical.

During the first stage reaction, HCl gas is evolved so means should be provided to scrub the vent gas from the reactor to remove HCl prior to releasing it from the atmosphere.

In the second stage reaction, the adduct from the first stage is reacted with sodium sulfide and sulfur in an aqueous alkanol reaction medium. The second stage is preferably carried out by charging aqueous sodium sulfide, water, alkanol and elemental sulfur flowers to a reactor and then adding the adduct to this at reaction temperature.

The sodium sulfide may be obtained from any of a number of sources. For example, it can be made by mixing approximate equal mole amounts of sodium hydrosulfide and sodium hydroxide. If hydrogen sulfide is available, it can be adsorbed in aqueous NaOH to form a solution of sodium sulfide and/or sodium hydrosulfide, depending upon the amount of hydrogen sulfide adsorbed. Whatever the source, the resulting solution should be adjusted with either NaOH, NaSH or $H_2S$ so that the resulting solution consists mainly of sodium sulfide with little or no free sodium hydroxide.

The amount of sodium sulfide can vary somewhat. For example, from about 0.13–0.7 gram mole for each 0.4–0.75 gram mole of sulfur monochloride used in the first reaction stage. Preferably, the amount of sodium sulfide is about 0.4–1.0 gram mole per mole of sulfur monochloride and most preferably about 0.8–1 gram mole per gram mole of sulfur monochloride.

The amount of water can vary widely without detrimental effect. Good results can be obtained using about 10–20 gram moles of water per gram mole of sodium sulfide. This includes water added as such, water in aqueous reactants and water which might be formed by reaction of hydrogen sulfide or sodium hydrosulfide with sodium hydroxide and forming sodium sulfide solution.

Alcohol is required in the second stage reaction. Preferably, these are lower alcohols containing 1–4 carbon atoms such as methanol, ethanol, n-propanol, n-butanol, isobutanol, tert-butanol and the like including mixtures thereof. The preferred alkanol is isopropanol either alone or mixed with other alkanols such as tert-butanol.

The amount of alkanol can vary over a wide range. A useful range is about 0.1–0.5 parts by weight per each part by weight of water. A more preferred range is about 0.2–0.4 parts by weight alkanol per each part by weight water.

The alcohols employed in the invention can either be virgin alcohols or a mixture of virgin alcohols and recycle alcohols obtained as a distillate from a previous sulfurization reaction. It has been observed that the use of recycle alcohols in the second stage reaction frequently results in sulfurized additives which are somewhat more soluble in polyalphaolefin oils than similar products produced from virgin alcohols alone.

The preferred amount of sulfur added is 0.009–0.28 gram atom per each 0.45–0.7 gram mole of sodium sulfide. More preferably, about 0.02–0.06 gram atom of sulfur are used per gram mole of sodium sulfide.

In a preferred mode of operation the mixture of sodium sulfide, sulfur and aqueous alkanol is stirred and heated to reaction temperature and then the adduct is added to it. However, the reaction can be carried out in other ways such as by adding the sodium sulfide, sulfur and aqueous alkanol mixture to the adduct or by mixing everything together and heating the mixture.

Preferred second stage reaction temperature is about 50° C. up to reflux temperature. A more preferred reaction temperature is about 60–80° C. After the adduct has been added to the sodium sulfide/sulfur/aqueous alkanol mixture, which is usually completed in about 1–8 hours, the mixture is preferably heated to reflux for about 2–8 hours to assure completion of reaction.

After reaction of the adduct with sodium sulfide and sulfur, the product is recovered by conventional methods such as removing alkanol, water washing, vacuum drying and filtering.

Thus, a preferred embodiment of the present invention is a sulfurized olefinic lubricating oil additive which imparts extreme pressure properties made by the process comprising (i) reacting sulfur monochloride with aliphatic monoolefin in the presence of minor amounts of an active Lewis acid at about 30°–100° C. using about 0.45 to 1.5 gram moles of aliphatic monoolefin for each 0.3 to 0.75 gram mole of sulfur monochloride to produce an adduct, (ii) reacting the adduct so produced with sulfur and sodium sulfide in an aqueous alkanol medium at a temperature of about 50° C. up to reflux using about 0.02–0.4 gram atom of sulfur per gram mole of sodium sulfide, and (iii) recovering said additive.

A more preferred embodiment of the present invention is a sulfurized olefinic lubricating oil additive which imparts extreme pressure properties made by the process comprising (i) reacting $S_2Cl_2$ with a $C_{3-6}$ aliphatic monoolefin at about 30°–100° C. in the presence of minor amounts of an active Lewis acid using about 0.45 to 1.5 gram moles of aliphatic monoolefin for each 0.3 to 0.75 gram mole of sulfur monochloride to produce an adduct, (ii) reacting the adduct so produced with sulfur and $Na_2S$ in an aqueous alkanol medium at a temperature of about 50° C. up to reflux using about 0.02–0.4 gram atom of sulfur per gram mole of $Na_2S$, and (iii) recovering said additive.

The following examples are presented to illustrate the invention and are not to be considered limiting as to any aspect thereof.

EXAMPLE I

Addition of Sulfur Monochloride to Isobutylene; Lewis Acid

Sulfur monochloride, 7.44 moles (1004.6 grams), and anhydrous ferric chloride, 6.8 millimoles (1.10 grams), was charged into a suitable reaction flask equipped with a stirrer, thermometer, a condenser maintained at 5° C. and a sub-surface gas sparger. Thereafter, gaseous isobutylene was bubbled into the reaction flask below the surface of the sulfur monochloride containing dissolved ferric chloride while stirring to bring the temperature up to about 60° C. Addition of isobutylene was continued for 4.1 hours while maintaining the temperature at 60° C. During the last 10 minutes of isobutylene addition, the temperature dropped to 50° C. A total of 753.0 grams (13.45 moles) of isobutylene was added. The reaction product was a clear amber oil that weighed 1,741.6 grams and represented 99.1 percent recovery of the reactants charged. Analysis showed an addition compound having a refractive index at 25° C. of 1.5291 containing 26.9 weight percent sulfur and 29.0 percent chlorine.

EXAMPLE II

Sulfurization of Isobutylene-Sulfur Monochloride Adduct; Lewis Acid

A reaction flask was charged with 65.6 grams of isopropanol, 20.2 grams of tert-butanol, 5.79 grams of sulfur flowers, 97.1 grams of 48 weight percent aqueous sodium hydrosulfide, 42.0 grams of 50 weight percent aqueous sodium hydroxide and 73.3 grams of water. The mixture was stirred and heated under nitrogen to 70° C. at which time 160.0 grams of the isobutylene-sulfur monochloride adduct of Example I was added dropwise over a 2-hour period at reflux (76°–78° C.). Heat was continued at reflux for 1.0 hour and then the alcohol was distilled out by heating up to 90° C. at atmospheric pressure. Following this, the pressure was reduced to 23" of Hg while allowing the flask to cool to about 73° C. to complete the removal of the alcohol and most of the water. To the resultant product was added 130.0 grams of water which, after stirring for 5 minutes, was allowed to settle for 15 minutes. The lower aqueous brine layer was separated and the organic layer was vacuum stripped (28" of Hg) at 105° C. After filtering the stripped organic layer through a bed of diatomaceous earth, a clear yellow oil weighing 99.6 grams was obtained. Analysis showed the sulfurized product to have a viscosity of 5.93 cSt at 100° C., a sulfur content of 45.6 weight percent and a chlorine content of 0.42 weight percent.

EXAMPLE III

Addition of Sulfur Monochloride to Isobutylene; Lewis Acid

Sulfur monochloride, 7.43 moles (1003.8 grams), and anhydrous ferric chloride, 6.8 millimoles (1.10 grams), was charged into a suitable reaction flask equipped with a stirrer, thermometer, a condenser maintained at 5° C. and a sub-surface gas sparger. Thereafter, gaseous isobutylene was bubbled into the reaction flask below the surface of the sulfur monochloride containing dissolved ferric chloride while stirring to bring the temperature up to about 60° C. Addition of isobutylene was continued for 4.3 hours while maintaining the temperature at 60° C. During the last 10 minutes of isobutylene addition, the temperature dropped to 50° C. A total of 754.2 grams (13.44 moles) of isobutylene was added. The reaction product was a clear amber oil that weighed 1750.5 grams and represented 99.4 percent recovery of the reactants charged. Analysis showed an addition compound having a refractive index at 25° C. of 1.5293 containing 27.3 weight percent sulfur and 28.8 weight percent chlorine.

EXAMPLE IV

Sulfurization of Isobutylene - Sulfur Monochloride Adduct; Lewis Acid

A reaction flask was charged with 60.5 grams of a recycled alcohol mixture obtained as a distillate from a previous sulfurization reaction containing 49.5 weight percent isopropanol and 29.1 weight percent tert-butanol. Following this, 35.7 grams isopropanol, 0.39 gram of sulfur flowers, 102.7 grams of 48 weight percent aqueous sodium hydrosulfide, 45.6 grams of 50 weight percent aqueous sodium hydroxide solution and 50.8 grams of water were added to the flask. The mixture was stirred and heated under nitrogen to 70° C. at which time 160.0 grams of the isobutylene-sulfur monochloride adduct of Example III was added dropwise over a 2-hour period at reflux (76–78° C.). Heat was continued at reflux for one hour and then the alcohol was distilled out by heating up to 90° C. at atmospheric pressure. Following this, the pressure was reduced to 23" of Hg while allowing the flask to cool to about 73° C. to complete removal of the alcohol and most of the water. To the resultant product was added 130.0 grams of water which, after stirring for 5 minutes, was allowed to settle for 15 minutes. The lower aqueous brine layer was separated and the organic layer was vacuum stripped (28" of Hg) at 105° C. After filtering the stripped organic layer through a bed of diatomaceous earth, a clear yellow oil weighing 96.9 grams was obtained. Analysis showed the sulfurized product to have a viscosity of 4.62 cSt at 100° C., a sulfur content of 44.5 percent by weight and a chlorine content of 0.53 percent by weight.

COMPARISON IA

Addition of Sulfur Monochloride to Isobutylene; No Lewis Acid

Sulfur monochloride, 1.63 moles (220.7 grams) was charged into a suitable reaction flask equipped with a stirrer, thermometer, a condenser maintained at 5° C. and a sub-surface gas sparger. Thereafter, gaseous isobutylene was bubbled into the reaction flask below the surface of the sulfur monochloride while stirring to bring the temperature up to about 60° C. Addition of isobutylene was continued for 2.5 hours while maintaining the temperature between 50° and 60° C. A total of 176.4 grams (0.72 mole) of isobutylene was added. The reaction product was a light yellow oil that weighed 376.8 grams and represented 96 percent recovery of the reactants charged. Analysis showed an addition compound having a refractive index at 25° C. of 1.5365 containing 27.5 weight percent sulfur and 28.7 weight percent chlorine.

COMPARISON IB

Sulfurization of Isobutylene-Sulfur Monochloride Adduct; No Lewis Acid

A reaction flask was charged with 76.4 grams of a recycled alcohol mixture obtained as a distillate from a previous sulfurization reaction containing 49.5 weight percent isopropanol and 29.1 weight percent tert-butanol. Following this, 28.7 grams isopropanol, 1.16 grams of sulfur flowers, 103.6 grams of 45 weight percent aqueous sodium hydrosulfide 42.0 grams of 50 weight percent aqueous sodium hydroxide and 47.5 grams of water were added to the flask. The mixture was stirred and heated under nitrogen to 70° C. at which time 160.0 grams of the isobutylene-sulfur monochloride adduct of Comparison IA was added dropwise over a 2-hour period at reflux (76°–78° C.). Heat was continued at reflux for 1.0 hour and then the alcohol was distilled out by heating up to 90° C. at atmospheric pressure. Following this, the pressure was reduced to 23" of Hg while allowing the flask to cool to about 73° C. to complete the removal of the alcohol and most of the water. To the resultant product was added 130.0 grams of water which, after stirring for 5 minutes, was allowed to settle for 15 minutes. The lower aqueous brine layer was separated and the organic layer was vacuum stripped (28" of Hg) at 105° C. After filtering the stripped organic layer through a bed of diatomaceous earth, a clear yellow oil weighing 106.7 grams was obtained. Analysis showed the sulfurized product to have a viscosity of 7.93 cSt at 100° C., a sulfur content of 43.8 weight percent and a chlorine content of 0.46 weight percent.

Solubility tests for which the results are given in Table I below were conducted by incorporating the products of Examples II, IV and Comparison IB at a concentration of 5 percent by weight in an oil of synthetic origin (1-decene oligomer - 40 cSt). Determinations were made at ambient room temperature, 0° C. and 65° C. after storage at the end of 1 week intervals for 4 weeks.

TABLE I

| Additive | Ambient Room Temperature | | | | 0° C. | | | | 65° C. | | | |
|---|---|---|---|---|---|---|---|---|---|---|---|---|
| | wk 1 | 2 | 3 | 4 | wk 1 | 2 | 3 | 4 | wk 1 | 2 | 3 | 4 |
| Example II | cld | cld | cld | cld | cld | cld | cld | cld | cl | cl | cl | cl |
| Example IV | cl | cl | cl | cl | cl | cl | cl | cl | cl | cl | cl | cl |
| Comparison 1B[1] | ins | ins | ins | ins | ins | ins | ins | ins | ins | ins | ins | ins |

[1]Comparative Olefin Polysulfide - no Lewis acid
cld = cloudy
cl = clear
ins = insoluble These results show the solubility of the additives of the present invention in polyalphaolefin synthetic oil.

Tests were performed to determine the extreme pressure properties of the additives of the invention by means of a 4-ball machine according to procedure ASTM D-2783. The lubricating formulations investigated consisted of a Citcon ISO 220 mineral oil base stock containing no additives of the present invention and Citcon ISO 220 mineral oil containing 1.0 percent by weight of an additive prepared in accordance with the teachings of the invention having a sulfur content of 46.7 weight percent. The results obtained are given in Table II below.

TABLE II

| | 4-ball tests | |
|---|---|---|
| | Load Wear Index | Weld Load (Kg) |
| Base oil (without additive) | 26.75 | 160 |
| Base oil + 1.0 wt % additive | 49.42 | 351 |

These results show that the utilization of the additives according to the invention is reflected by a considerable increase in ball weld load.

The sulfurized olefins of the invention are especially useful as extreme pressure additives for lubricating oil formulations, especially in gear applications. The base oils can be of mineral or synthetic origin. Synthetic oils include, in particular, olefin oligomers such as decene trimer, tetramer and pentamer made by oligomerizing 1-decene using a $BF_3$ catalyst. Useful olefin oligomers can be made using other catalysts such as the aluminum alkyl Ziegler catalyst. Likewise, other olefins can be used such as $C_{6-14}$ 1-olefins.

In this application, the sulfurized olefin products of the invention are added in amounts sufficient to improve the extreme pressure property of the lubricant. Amounts of from 0.2 to 10.0 wt% are usually sufficient.

These additives can be used in combination with other conventional additives which perform various functions. Examples of such other additives are corrosion inhibitors for ferrous and non-ferrous metals such as tetrapropenyl succinic acid and bis-(2,5-alkyldithio)-1,3,4-thiadiazoles as well as antiwear additives such as alkyl or aryl phosphonates, phosphites, thiophosphates, dithiophosphates, and phosphoric acids. Also zinc dialkyl or diaryl dithiophosphate, chlorinated hydrocarbons, sulfurized fatty esters and amines can be added.

We claim:

1. A sulfurized olefinic lubricating oil additive which imparts extreme pressure properties made by the process comprising (i) reacting sulfur monochloride with aliphatic monoolefin consisting essentially of monoolefin selected from isobutene, 2-methyl-1-butene and 2-methyl-2-butene, wherein the ethylenic double bond adjoins a tertiary carbon atom, in the presence of minor amounts of an active Lewis acid at about 30°–100° C. using about 0.45 to 1.5 gram moles of aliphatic monoolefin for each 0.3 to 0.75 gram mole of sulfur monochloride to produce an adduct which, after sulfurization, affords a lubricant additive which is soluble at a concentration of 5 percent by weight at a temperature of 0° C. in polyalphaolefin synthetic oils, (ii) reacting the adduct so produced with sulfur and sodium sulfide in an aqueous alkanol medium at a temperature of about 50° C. up to reflux using about 0.02–0.4 gram atom of sulfur gram mole of sodium sulfide, and (iii) recovering said additive.

2. A sulfurized additive of claim 1 wherein said monoolefin is isobutene.

3. A sulfurized additive of claim 1 wherein said active Lewis acid is ferric chloride.

4. A sulfurized additive of claim 1 wherein said active Lewis acid is present in an amount of from about 0.025 percent to about 5.0 percent by weight of Lewis acid based on the weight of sulfur monochloride present.

5. A lubricating oil composition comprising a major proportion of a mineral or synthetic lubricating oil and a minor proportion sufficient to improve its extreme pressure properties of at least one sulfurized oil additive of claim 1.

6. A sulfurized olefinic lubricating oil additive which imparts extreme pressure properties made by the process comprising (i) reacting sulfur monochloride with aliphatic monoolefin consisting essentially of monoolefin selected from isobutene, 2-methyl-1-butene and 2-methyl-2-butene, wherein the ethylenic double bond adjoins a tertiary carbon atom, in the presence of from about 0.05 to 3.0 percent by weight, based on the weight of sulfur monochloride, of an active Lewis acid at a temperature of about 40° -75° C. using about 1.7-2.0 gram moles of aliphatic monoolefin for each gram mole of sulfur monochloride to produce an adduct which, after sulfurization, affords a lubricant additive which is soluble at a concentration of 5 percent by weight at a temperature of 0° C. in polyalphaolefin synthetic oils (ii) reacting the adduct so produced with sulfur and sodium sulfide in an aqueous alkanol medium containing about 0.1 to 0.5 parts by weight alkanol for each part by weight water at a temperature of about 60°-80° C. using about 0.02-0.4 gram atom of sulfur per gram mole of sodium sulfide and about 0.4-1.0 gram mole of sodium sulfide per gram mole of sulfur monochloride used in (i), and (iii) recovering said additive.

7. A sulfurized additive of claim 6 wherein said active Lewis acid is ferric chloride.

8. A sulfurized additive of claim 6 wherein said monoolefin is isobutene.

9. A sulfurized additive of claim 6 wherein the water is present in an amount of from about 10-20 gram moles per gram mole of sodium sulfide.

10. A process for preparing sulfurized olefin comprising (i) reacting sulfur monochloride with aliphatic monoolefin consisting essentially of monoolefin selected from isobutene 2-methyl-1-butene and 2-methyl-2-butene, wherein the ethylenic double bond adjoins a tertiary carbon atom, in the presence of minor amounts of an active Lewis acid at a temperature of about 30°-100° C. using about 0.45 to 1.5 gram mole of sulfur monochloride to produce an adduct which, after sulfurization, affords a lubricant additive which is soluble at a concentration of 5 percent by weight at a temperature of 0° C. in polyalphaolefin synthetic oils (ii) reacting the adduct so produced with sulfur and sodium sulfide in an aqueous alkanol medium at a temperature of about 50° C. up to reflux using about 0.02-0.4 gram atom of sulfur per gram mole of sodium sulfide, and (iii) recovering said additive.

11. A process for preparing a sulfurized olefin comprising (i) reacting sulfur monochloride with aliphatic monoolefin consisting essentially of monoolefin selected from isobutene, 2-methyl-1-butene and 2-methyl-2-butene, wherein the ethylenic double bond adjoins a tertiary carbon atom, in the presence of from about 0.05 to 3.0 percent by weight, based on the weight of sulfur monochloride, of an active Lewis acid at a temperature of 40°-75° C. using about 1.7-2.0 gram moles of aliphatic monoolefin for each gram mole of sulfur monochloride to produce an adduct which, after sulfurization, affords a lubricant additive which is soluble at a concentration of 5 percent by weight at a temperature of 0° C. in polyalphaolefin synthetic oils, (ii) reacting the adduct so produced with sulfur and sodium sulfide in an aqueous alkanol medium containing about 0.1 to 0.5 parts by weight alkanol for each part by weight water at a temperature of about 60°-80° C. using about 0.02-0.4 gram atom of sulfur per gram mole of sodium sulfide and about 0.4-1.0 gram mole of sodium sulfide per gram mole of sulfur monochloride used in (i), and (iii) recovering said additive.

12. The process of claim 11 wherein said active Lewis acid is ferric chloride.

13. The process of claim 11 wherein the water is present in an amount of from about 10-20 gram moles per gram mole of sodium sulfide.

14. The process of claim 12 wherein said monoolefin is isobutene.

15. A sulfurized additive of claim 1 wherein said active Lewis acid is ferric bromide.

16. A sulfurized additive of claim 1 wherein said active Lewis acid is stannic chloride.

* * * * *

UNITED STATES PATENT AND TRADEMARK OFFICE
CERTIFICATE OF CORRECTION

PATENT NO. : 4,954,274

DATED : September 4, 1990

INVENTOR(S) : Edward F. Zaweski and James G. Jolly

It is certified that error appears in the above-identified patent and that said Letters Patent is hereby corrected as shown below:

On the title page, the assignee has been omitted. The assignee should read -- Ethyl Petroleum Additives, Inc., St. Louis, Missouri --.

On the title page, the attorney has been omitted. The attorney should read -- David M. Bunnell --.

Signed and Sealed this

Third Day of March, 1992

Attest:

HARRY F. MANBECK, JR.

Attesting Officer

Commissioner of Patents and Trademarks